United States Patent [19]

Rizzo et al.

[11] 4,023,820
[45] May 17, 1977

[54] TIRE REMOVING DEVICE AND METHOD

[76] Inventors: Catherine L. Rizzo, 1641 NW. 8th Ave., Fort Lauderdale, Fla. 33311; Joseph Rizzo, 291 NE. 38th St., Apt. 4, Oakland Park, Fla. 33334

[22] Filed: Dec. 17, 1975

[21] Appl. No.: 641,422

Related U.S. Application Data

[63] Continuation-in-part of Ser. No. 489,801, July 18, 1974, abandoned.

[52] U.S. Cl. ............................... 280/288; 157/1.1
[51] Int. Cl.² .................... B62K 3/02; B60C 25/02
[58] Field of Search ............ 157/1, 1.1, 1.17, 1.22; 280/288, 289

[56] References Cited
UNITED STATES PATENTS

| | | | |
|---|---|---|---|
| 972,510 | 10/1910 | Cosset | 280/288 |
| 1,220,659 | 3/1917 | Mansbach | 157/1.22 |
| 1,234,141 | 7/1917 | DeVine | 157/1.22 |

FOREIGN PATENTS OR APPLICATIONS

| | | | |
|---|---|---|---|
| 16,835 | 8/1898 | United Kingdom | 280/288 |
| 10,562 | 5/1911 | United Kingdom | 280/288 |

*Primary Examiner*—James L. Jones, Jr.
*Assistant Examiner*—James G. Smith

[57] ABSTRACT

A vehicle tire removing device including a tire iron connectable to a vehicle body in a fixed working position adjacent the tire to be removed from the rim of the wheel of the vehicle. The vehicle wheel may be rotated about its axle in a normal manner while the tire iron is in a working position to remove the tire from the rim of the wheel of the vehicle without removing the wheel from the vehicle axle. The vehicle tire removing device includes an improved fork means for bicycles and other vehicles having fork held wheel axles. The improved fork means provides a tire and the tube removal space between one end portion of the axle and one arm of the fork.

5 Claims, 11 Drawing Figures

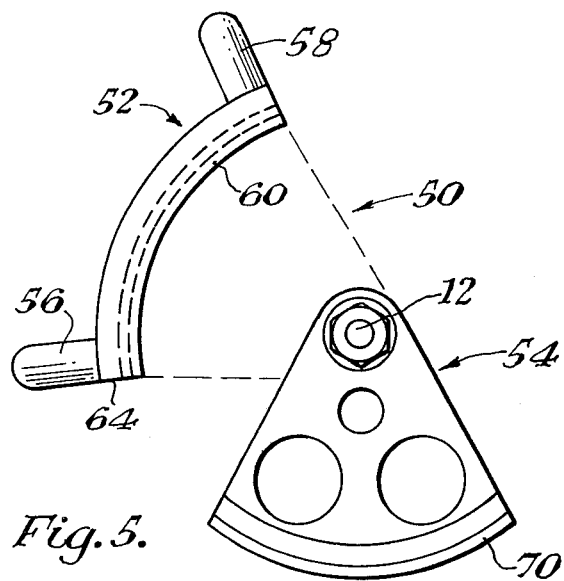
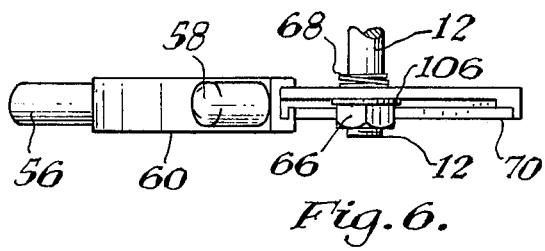
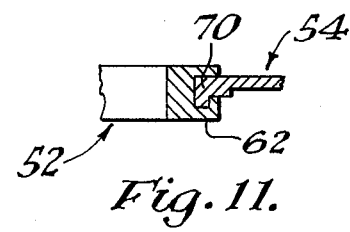
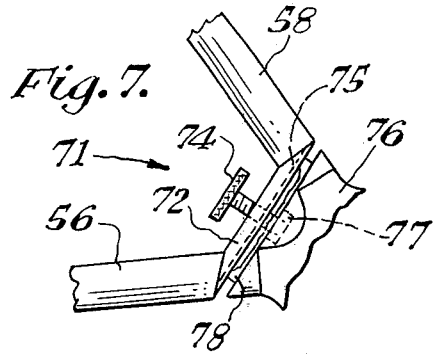
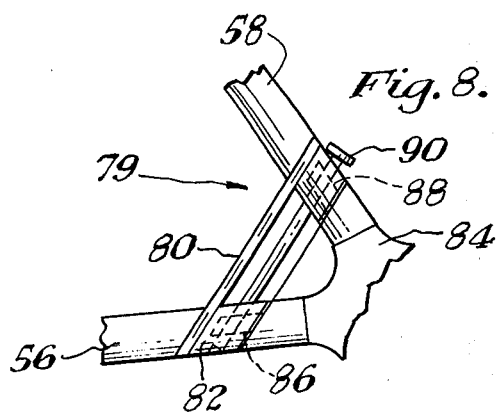
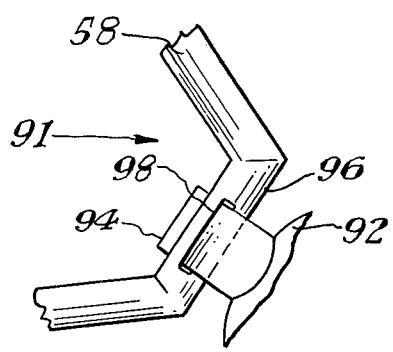
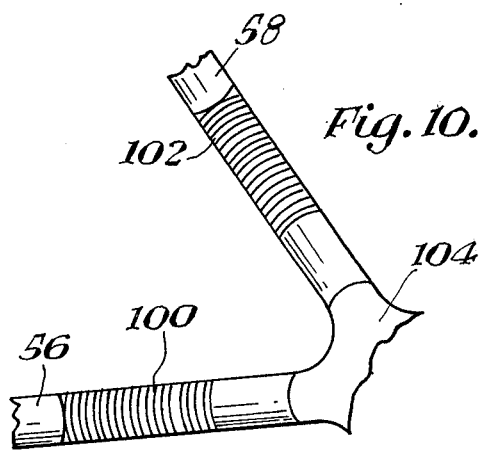

TIRE REMOVING DEVICE AND METHOD

This is a continuation of application Ser. No. 489,801, filed July 18, 1974, which is now abandoned.

BACKGROUND OF THE INVENTION

In the past, in order to replace a tire and tube on a wheel of a vehicle, the wheel had to be first removed from the vehicle in order to position the wheel and tools to remove the tire and tube from the rim of the wheel. Many tire and tube removal devices for removing both the tire and tube from the rim of a wheel that was first detached from the vehicle have been constructed in the past.

BRIEF DESCRIPTION OF THE INVENTION

The new and improved vehicle tire removing device includes a tire iron and a vehicle tire iron connecting means. The tire iron is connectable to a vehicle body in a working position or a rest position by the connecting means. The tire iron, when in a working position, is fixed adjacent the tire to be removed from the rim of the wheel of a vehicle. The vehicle wheel, while still attached to the vehicle, is thereafter rotated about its axle. The tire iron in the working position removes the tire from the rim of the wheel. The tire and tube are, therefore, removed from the rim of the wheel for repair without the necessity of disconnecting and removing the wheel from the vehicle.

The vehicle tire removing device may include an improved fork means for bicycles and other vehicles having a fork for holding the wheel axle. The improved fork means provides a tire and tube removal space between one end of the axle and one arm of the fork for replacing or removing the tire and tube. A movable portion of the improved fork is positionable in an open position or a closed position without using any tools as shown in FIGS. 5, 7 and 8. The movable portion, as shown in FIGS. 9 and 10, may be moved after removal of the fork nut by utilizing the handle portion 24 of the tire iron.

The new and improved method of removal includes first positioning a tire iron between the tire and rim of the wheel; second, fixing the position of the tire iron in relationship to the vehicle; third, attaching the tire iron to the vehicle; fourth, rotating the tire and wheel about the vehicle axle attached to the vehicle to remove the tire iron from the rim of the wheel for repair or inspection; fifth, opening the movable portion of the fork; and sixth, removing the tire and tube through the opening and leaving the wheel attached to the vehicle.

It is an object of this invention to provide a new and improved tire iron means for removing a tire and tube from the rim of a vehicle wheel while the wheel remains attached to the vehicle.

Another object of this invention is to provide a fast, clean and non-complex means and method for removing a tire and tube from the rim of a vehicle wheel that is connected to the vehicle in a normal working position.

Another object of this invention is to provide a tire and tube removal means and method that is easily accomplished by a person without great strength.

Another object of this invention is to provide a means of removing the tire and tube from the rim of a wheel on a bicycle in an upright position without inverting or lying the bicycle on its side.

A further object of this invention is to provide a new and improved tire iron holder.

An additional object of this invention is to provide a new and improved fork means to provide a tire and tube removal space between one end of the vehicle axle and the adjacent arm of the fork.

In accordance with these and other objects which will be apparent hereinafter, the instant invention will now be described with particular reference to the accompanying drawings.

BRIEF DESCRIPTION OF THE DRAWINGS

In the drawings:

FIG. 5 is a side view of the improved fork means in an open position;

FIG. 6 is a top view of the improved fork means as shown in FIG. 5;

FIG. 7 is a partial side view of a second improved fork means;

FIG. 8 is a partial view of a third improved fork means;

FIG. 9 is a partial side view of a fourth improved fork means;

FIG. 10 is a partial view of a fifth improved fork means; and

FIG. 11 is a cross-sectional view of FIG. 6.

DESCRIPTION OF THE PREFERRED EMBODIMENTS

Figure 1:
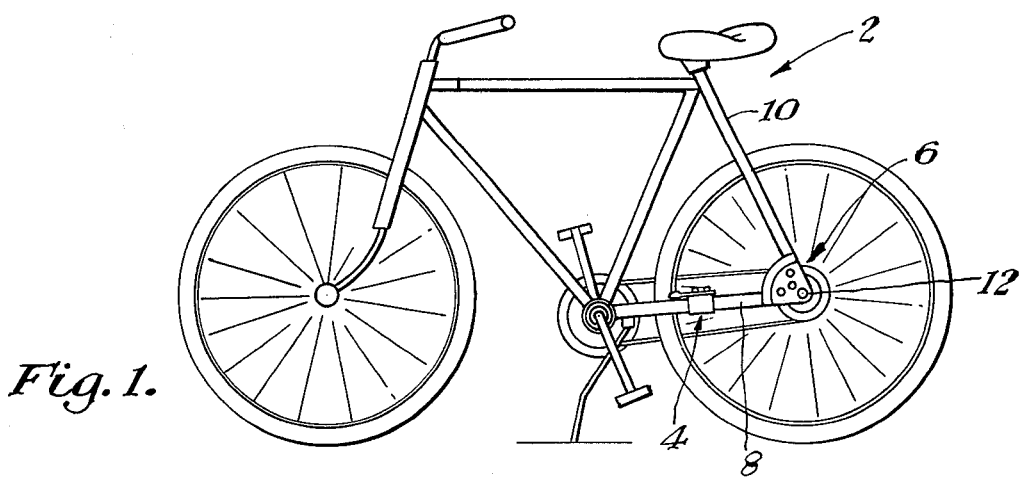
FIG. 1 is a side view of a bicycle including the tire removing device and improved fork means.

Referring now to FIG. 1, the bicycle, generally designated by 2, includes the tire removing device 4 and an improved fork means 6. The tire removing device is connected to the bicycle frame member 8. The improved fork means 6 is connected between the bicycle frame means 8 and 10 and the rear axle 12. The improved fork means 6 may be attached to either side of the bicycle frame adjacent the rear of the bicycle.

Figure 2:
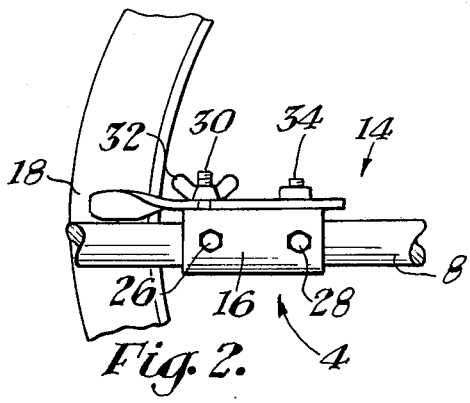
FIG. 2 is a side view of the tire removing device in a rest position connected to a portion of the bicycle frame.
Figure 3:
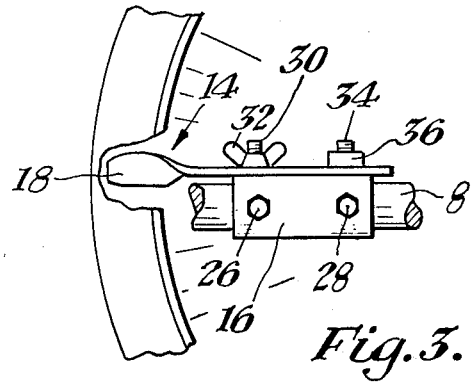
FIG. 3 is a side view of the tire removing device in a working position connected to a portion of the bicycle frame.
Figure 4:
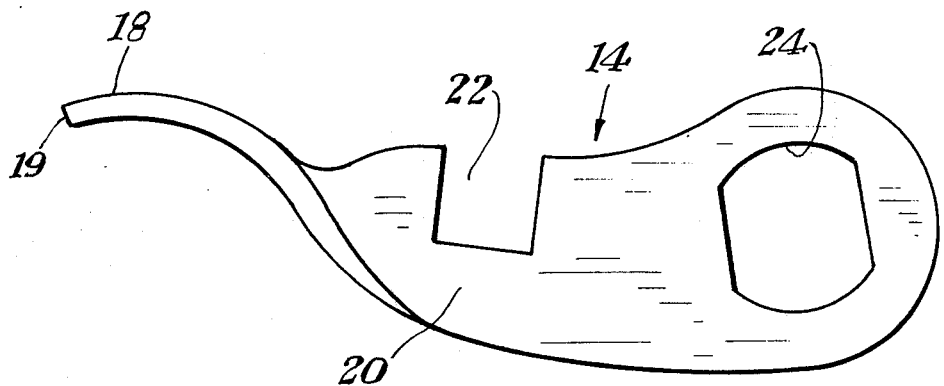
FIG. 4 is a top view of the tire iron.

Referring now to FIGS. 2, 3 and 4, the tire removing device 4 is shown in a rest position in FIG. 2 and in a working position in FIG. 3. The tire removing device includes a tire iron 14 and a bicycle connecting means 16. The tire iron 14 includes a cam surface 18 with a blunt or pointed end 19 and a body portion 20. The cam surface 18 may be coated with teflon or the like. The body portion includes a slot 22 and opening 24 for positioning and securing the tire iron to the vehicle. The tire iron connecting means 16 shown as a tubular member, may be removably connected to the bicycle frame member by screws 26 and 28. The tire iron connecting means 16 also includes an upright threaded member 30 that passes through slot 22 and mates with wing nut 32. The wing nut 32 is used to secure the tire iron to the connecting means 16 in a working position, see FIG. 3, or a rest position, see FIG. 2. Threaded means 34 passes through opening 24 and may include a fixed lug 36 or an adjustable nut, not shown, in order to hold the rear portion of the tire iron in position when the upstanding member 34 lies against one edge of opening 24.

It should be noted that the tire iron 14 may be connected to the bicycle connecting means 16 by lugs having upwardly movable resilient connecting means in order to move the tire iron from a rest position, see FIG. 2, to a working position between the tire and the rim as shown in FIG. 3.

The improved fork means 50 includes a fixed member 52 and a movable member 54, as shown in FIGS. 5, 6 and 11. The fork means 50 includes a fixed member 52 connected to the bicycle frame 8 and 10 by inserting connecting arms 56 and 58. The fork means 50 includes a body 60 having a generally C-shaped cross-section as shown at 62 in FIG. 11. The body 60 includes a lower plate 64 covering the C-shaped opening. The movable member 54 with an enlarged distal end 70 is mounted on the axle 12 for free movement from a closed position with end 70 in engagement with plate 64 to a position shown in FIG. 5. The movable member 54 is held on the axle by nut 66. A spring 68 may be used to bias the movable member 54 into the position shown in FIG. 5. One end of the spring is removably connected to the axle or the movable member in order to release the spring tension.

FIG. 7 shows a second improved fork means, including a fixed member 71 with connecting arms 56 and 58, a notched intermediate member 72 having a movable connecting thumbscrew 74 therein. The second forked means includes a movable portion 76 with a flange portion 78 that can be inserted into the notch 75. A connecting means such as a nut 77, may be connected to movable member 76. A collar may be substituted for the flange portion 78 and connected to the movable member 76. The thumbscrew 74 connects the movable portion 76 to the bicycle through the fixed member. The movable member 76 of the second improved fork means may be removed by loosening the thumbscrew 74 and removing the bicycle axle nut from the axle. The thumbscrew 74 may be removed from collar, when the collar is substituted for the flange portion 78 in order to allow the collar to be removed to provide a removal space without removing the axle nut.

Referring now to FIG. 8 showing a third improved fork means, including a fixed member 79 with bicycle frame connecting portions 56 and 58 and a hinge means 80. The hinge means 80 includes an intermediate movable portion 82. The movable member 84 is connected to the axle by the axle nut. The movable member 84 is connected to the intermediate portion 82 by arms 86 and 88 and locking pin 90. The tire may be removed from this fork means by removing the pin 90 and swinging the intermediate portion 83 out of position, or the tire may be removed by removing the axle nut, and thereafter, pivoting the movable portion 84 out of position to provide a removal space.

The fourth improved fork means is shown in FIG. 9. This fork means includes a fixed member 91 having bicycle frame connecting arms 56 and 58. The fork means includes a removable portion 92 that has a generally S-shaped connecting portion 94 at one end thereof. An intermediate bar portion 96 is positioned between the arms 56 and 58. The intermediate bar portion 96 has a slot 98 therein. The movable member 92 may be removed from the bicycle axle by removing the axle nut, and thereafter, swinging the movable member 92 outwardly in order to move the distal end portion 94 out through slot 98 in the intermediate bar member 96.

Another improved fork means is shown in the FIG. 10, wherein flexible members 100 and 102 are connected between arm member 56 and 58, respectively, and the movable portion 104. This improved fork means can be moved away from the axle after the bicycle axle nut is removed.

It should be noted that the movable member 54 is freely rotatable on a spacer 106, shown in FIG. 6, that is connected over axle 12 and prevents nut 66 from binding the movable member 54 into a fixed position. Further, if the bicycle includes a well known coaster brake arm clamp, the distal end of said arm should be releasably connected to the bicycle frame member 8. The normal coaster brake arm should be slotted at its distal end. A spring clamp may then be used to secure the arm to the member 8. A first portion of the spring clamp may be shaped so that it may be pressed over the member 8. The other portion of the spring clamp may include a U-shaped spring portion that can be pressed through the slot in the coaster brake arm to clamp the arm into a fixed relationship with the member 8. Thereafter, the spring clamp or the coaster arm may be easily released to remove a tire from the bicycle axle.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A vehicle tire removing device for removing a tire from a wheel movably connected to a vehicle comprising;
   a tire iron,
   a tire iron connecting means rigidly connectable to the vehicle in a stationary manner, said tire iron connecting means including a tire iron positioning means to position said tire iron in a working position between an adjacent tire and the rim of the adjacent tire to remove the tire from the rim of the wheel, whereby
   the wheel movably connected to the vehicle may be rotated about its axle in a normal manner while the tire iron is held in said working position so that the tire iron may remove at least a portion of the tire from the rim of the wheel.

2. A vehicle tire removing device, as set forth in claim 1 wherein;
   said tire iron includes a body with a cam surface at one end of said body, said body including mating connecting means for engagement with said tire iron connecting means.

3. A vehicle frame comprising in combination,
   a tire iron,
   a tire iron connecting means fixed to the vehicle frame in a stationary manner, said tire iron connecting means including a tire iron positioning means to position said tire iron in a working position between an adjacent tire and the rim of the adjacent tire to remove the tire from the rim of the wheel, whereby the wheel movably connected to the vehicle may be rotated about its axis in a normal manner while the tire iron is held in said working position so that the tire iron may remove at least a portion of the tire from the rim of the wheel, and
   a movable fork means connected between the vehicle frame and one end portion of the vehicle wheel axle for providing a tire and tube removal space between the vehicle frame and one end portion of the axle.

4. A method of removing a tire from the rim of a wheel attached in the normal manner to a vehicle axle by the steps of:
   first, positioning a tire iron between the rim of a wheel and the tire,
   second, fixing the position of said tire iron in the work position by rigidly connecting said tire iron to the vehicle body in a stationary position; and
   third, rotating the wheel on the vehicle about the vehicle axle to remove the tire from the wheel.

5. A vehicle tire removing device for removing a tire from a wheel that is movable connected to a vehicle comprising;
   a tire iron means including connecting means for rigidly fixing the tire iron on the vehicle in a working position, said tire iron means including a body with a cam surface at one end of said body, said body supporting at least a portion of said connecting means for removably mating with the vehicle,
   said connecting means rigidly connectable to the vehicle to fix said cam surface in a rigid manner in relation to the vehicle said tire iron means positionable in a working position between an adjacent tire and the rim of the adjacent tire on the vehicle in order to remove the tire from the rim of the wheel, whereby
   the wheel movably connected to the vehicle may be rotated about its axle in a normal manner while the tire iron means is held in said working position to remove at least a portion of the tire from the rim of the wheel.

* * * * *